INVENTOR.
André Montel

United States Patent Office 3,548,393

Patented Dec. 15, 1970

3,548,393

RACK TYPE MOUNTING PLATE FOR MAGNETIC HEAD

André Montel, Paris, France, assignor to Societe d'Instrumentation Schluberger, Paris, France, a French corporation Filed Dec. 11, 1967, Ser. No. 689,684
Claims priority, application France, Dec. 13, 1966, 87,151
Int. Cl. G11b *5/10, 5/28, 5/42*
U.S. Cl. 340—174.1 15 Claims

ABSTRACT OF THE DISCLOSURE

A magnetic head comprising two substantially parallel rows of transversely aligned half-cores has the pole ends of the half-cores spaced apart and maintained in transverse parallel alignment by spaced slots formed in opposite edges of a non-magnetic spacer plate. The pole ends project from an exterior surface of the spacer plate and are constrained against outward displacement by two rows of abutments, which take the form of transversely opposed end walls formed by rectangular apertures in a second plate which is mounted on the exterior surface of the spacer plate.

This invention relates generally to magnetic storage devices for reading or recording digital information and, more particularly, to a multiple-head magnetic storage device.

In the computing art, use is made of what are commonly referred to as "mass storage memories" which are typically formed of several superimposed magnetic discs. Each disc carries a large number of concentric circular tracks on which information is recorded and stored in digital form. Multiple-channel magnetic heads are often used for recording and reading out these tracks.

These magnetic heads are typically mounted on moving arms capable of moving opposite the tracks in such a manner as to select the desired stored information. In such prior art devices, the relatively large inertia of the mechanical system introduces relatively long time delays into the time required for reading out the stored information. Practical considerations, such as costs, make unfeasible the possibility of reducing such mechanical movements by providing, for instance, as many magnetic heads as there are tracks.

Moreover, the manufacture of conventional magnetic heads usually entails highly refined finishing steps, including machining to high accuracy, with the result that the price of these heads is very high. With single or multitrack heads, problems of particular importance arise in accurately obtaining and maintaining air gaps between adjacent pole ends of but a few microns.

In the case of composite or multitrack heads, other problems arise, the most important being that of accurately aligning the various air gaps. For example, in one known prior art arrangement, a composite head is formed of two half-shells having slots formed therein to incorporate magnetic circuits which are separated from one another by insulating screens. The manufacture of these half-shells usually requires high precision machining, firstly to cut out the slots to locate the magnetic circuits and screens and, secondly, to true the mid contact surfaces of the two half-shells which establish therebetween the alignment of the air gaps. Another costly operation is involved in installing a positioning and retaining device, such as a wedge, in each air gap with the desired thickness of a few microns. Finally, the winding of each magnetic half-core is generally a delicate operation which usually entails the use of special winding machines.

It is an object of this invention to provide a magnetic head which may be produced at a considerably lower cost than known prior art magnetic heads.

Another object of this invention is to provide a magnetic head which is advantageously adaptable to uncomplicated and inexpensive manufacturing techniques.

According to this invention, a magnetic head is formed by several parallel magnetic circuits in which the air gaps between adjacent pole ends are aligned. Each magnetic circuit is comprised of two half-cores on which are mounted electrical windings. The half-cores are positioned opposite one another and are spaced apart to provide two spaced-apart poles which define a gap therebetween. The internal contour of each half-core includes a flat surface contiguous to each of the edges which is set back relative thereto. The flat surfaces of the two half-cores abut supporting surfaces formed by two parallel rows of spaced-apart and transversely aligned recesses formed in opposite edges of a common spacer plate. The width of the gaps defined by the two spaced-apart edges of the half-cores are determined by the distance between the bottom surfaces of the oppositely aligned recesses in the spacer plate.

In addition, each half-core has, in the vicinity of the gap, a second flat surface on which a blocking plate is adapted to rest so as to maintain the half circuits in proper abutting relationship with the common spacer. In accordance with one embodiment of this invention, the recesses in the common spacer are of generally rectangular shape and the internal contour of each half-core contiguous to the edge defining one side of the gap has the shape of a right angle, whereby two contiguous edges of each half-core rest against the said common spacer.

As a result of the setback configuration of the flat, internal surface of each half-core, it is possible to obtain an air gap with close spacing through the relatively simple and inexpensive expedient of, for example, grinding a surface of a much larger and more easily manageable part, the half-core. Furthermore, a spacer plate having sufficient longitudinal rigidity to enable accurate alignment of air gaps may be obtained by automatically stamping or cutting out portions of the spacer plate, thereby further reducing the cost of manufacture of the magnetic head.

For a better understanding of the present invention, together with other and further objects thereof, reference may be had to the following description taken in connection with the accompanying drawings, the scope of the invention being pointed out in the appended claims:

Referring to the drawings.

Figure 1:
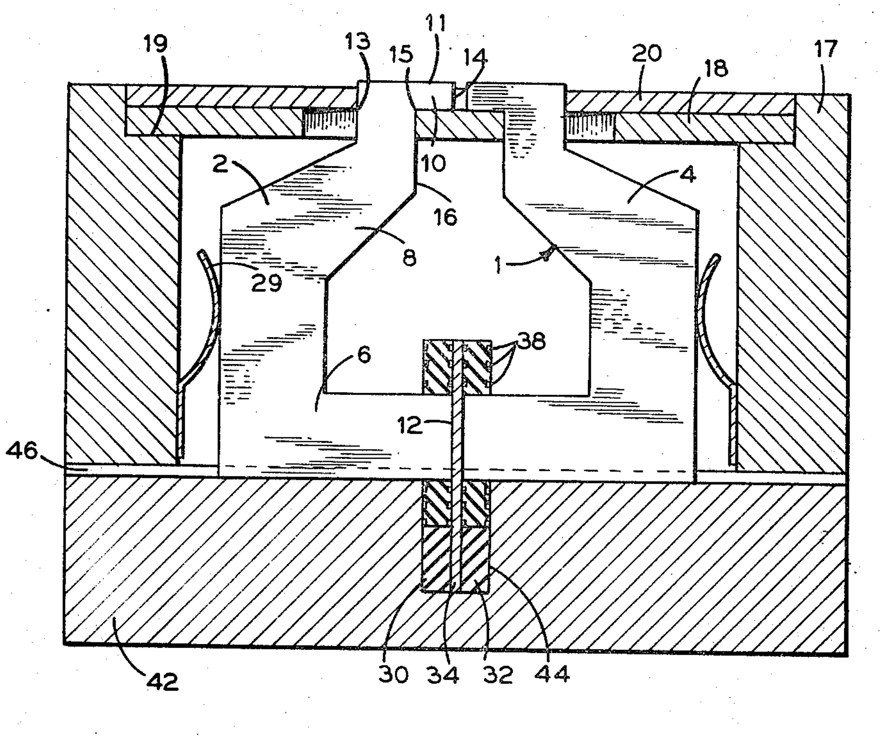
FIG. 1 illustrates a transverse section of a magnetic head constructed in accordance with this invention.

In FIG. 1 a magnetic circuit 1 consists of two half-cores 2 and 4. Each half-core consists of a sandwiched arrangement of metal blades having high magnetic permeability. These blades are cut out heat treated and then sandwiched in a mold and made to adhere together. Each half-core includes an upper part 10 linked by an oblique branch 8 to an L-shaped base 6. This upper part 10 has the shape of a flat bracket defined by two right-angled external edges 11 and 13 and two internal edges 15 and 16, respectively, which are parallel to edges 11 and 13. The upper, inner edge 14 of the bracket is in the same vertical plane as surface 12 of base 6. Edges 12 and 14 are trued and calibrated by taking internal edge 16 of the upper bracket as the reference edge. The horizontal distance between the edge 16 and the two vertically aligned edges 12 and 14 is critical since it determines the width of an air gap formed between the edge 14 of the half-core 2 and the correspondingly opposite edge of the half-core 4 and also establishes the alignment of various magnetic circuits which will be described in detail subsequently.

Figure 4:
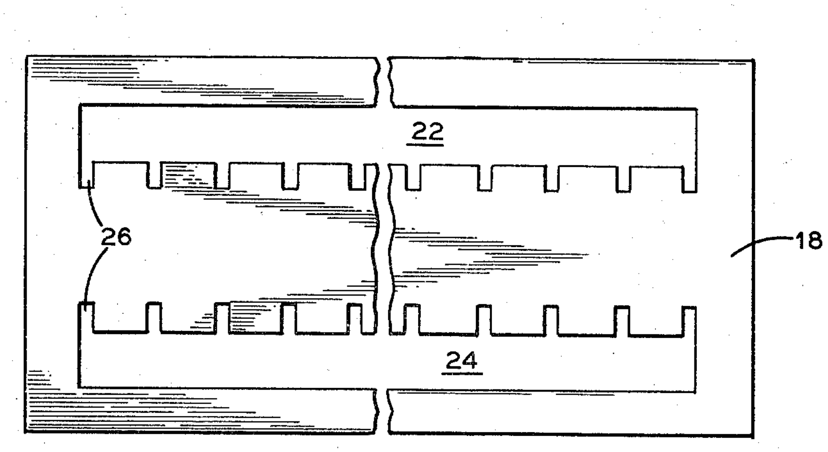
FIG. 4 is a top view of a core spacer plate.

A number of magnetic circuits 1 are placed parallel in a casing 17 which may take the general form of a parallelepiped box open at top and bottom. The magnetic circuits are maintained in place by two plates 18 and 20 which fit into a peripheral groove 19 machined in the upper end of the casing 17. The first of these plates 18 (FIGS. 1 and 4) is herein termed a "common spacer" and comprises a rectangular sheet of non-magnetic metal, brass or bronze-beryllium, for example, which may be appropriately cut out by precision stamping apparatus. The common spacer 18 is formed with two longitudinal slots 22 and 24 which are symmetrical relative to the longitudinal axis of the common spacer. The inner edge of defining one side of each of these slots is provided with a number of identical, transversely aligned U-shaped notches 26 corresponding in number to the number of half-cores which are to be incorporated in the magnetic head. Pairs of notches transversely oppose one another and in each notch there is fitted the upper bracket 10 of a half-core, with edge 16 of each half-core abutting the bottom wall of each notch. It will be understood that the slots 22 and 24 and the notches 26 should be cut-out of the spacer with considerable accuracy since the surfaces defined by these slots and notches ultimately determine the thickness of the air gaps and the alignment of the magnetic circuits. Using present slot and notch forming techniques, for example, it is quite possible to obtain excellent accuracy for these purposes, that is, accuracies on the order of 3 to 5 microns.

A rectangular blocking plate 20, also made out of non-magnetic metal, has the same exterior dimensions as that of the common spacer 18. Equidistant transverse slots 28, with the same thickness as the magnetic circuits, are cut out by, for example, by metal stamping apparatus. The slots 28 receive and retain the upper brackets 10 of the magnetic circuits by preventing the outward separation of the upper ends of each pair of half-cores 2 and 4. With the plate 20 properly positioned upon the common spacer 18, the slots 28 should be on vertical alignment with the notches 26.

Figure 2:
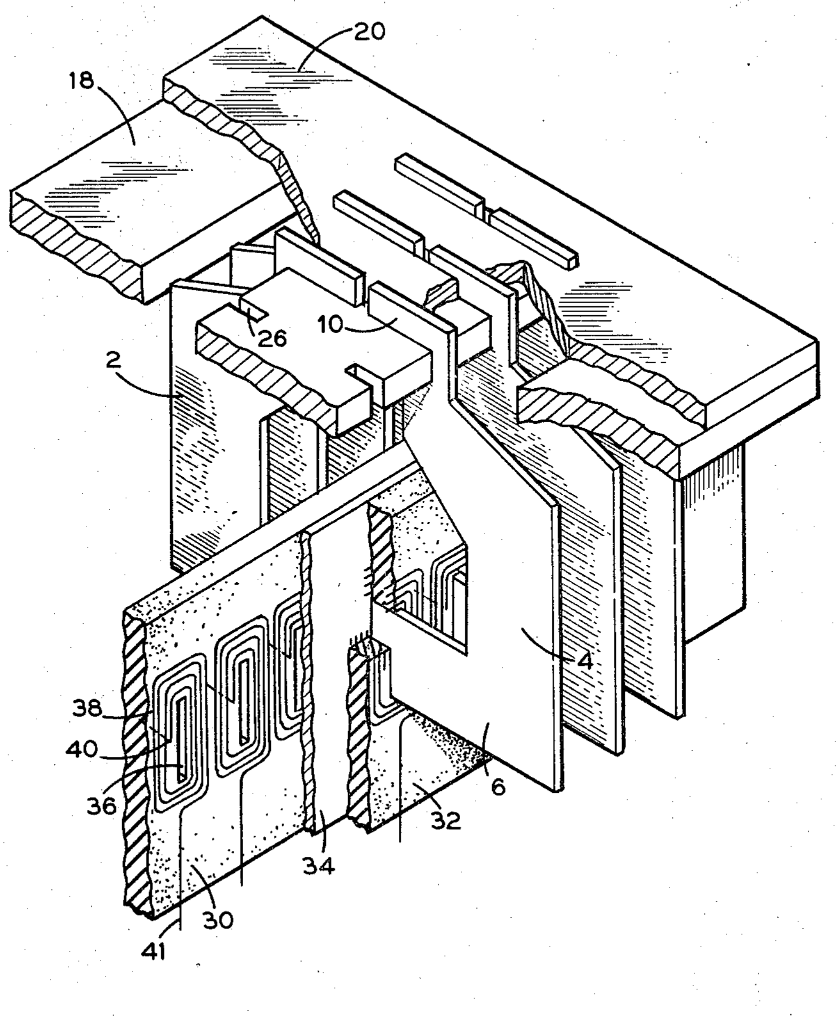
FIG. 2 is a perspective view of a portion of the magnetic head with a casing for the head removed.
Figure 3:
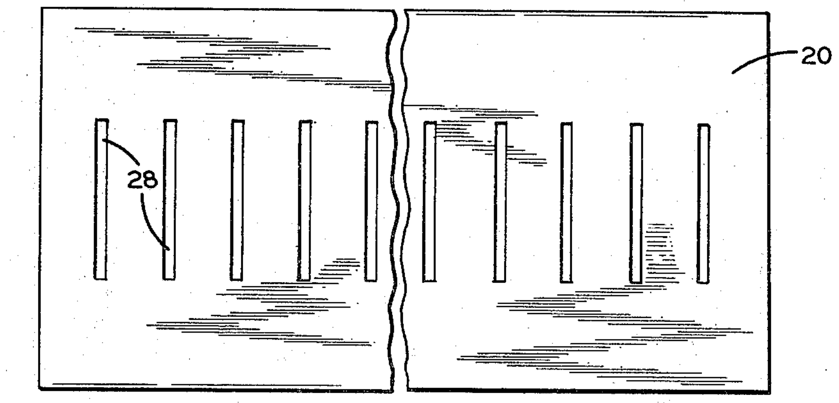
FIG. 3 is a top view of a plate for maintaining adjacent cores of the magnetic head in parallel alignment.

Referring again to FIG. 1, the edge 12 at the base of each half-core is biased by a common blade spring 29 to abut a bottom air gap wedge 34. The wedge 34 is formed of a non-magnetic material, mica, for example, and extends throughout the entire length of the magnetic head, FIG. 2. The wedge 34 is sandwiched between two flat ceramic plates 30 and 32 having rectangular slots 36 extending transversely therethrough, FIG. 2, and matched to receive therein portions of the bases 6 of the half-cores 2 and 4. Spiral printed magnetic circuits 38 are laid or formed concentrically around each slot 36 and on the two surfaces of ceramic plates 30 and 32. The circuit on one surface of the plate 30 or 32 is connected to the circuit on the opposite surface of the same plate through holes 40 which extends transversely through the respective plates 30 and 32, FIG. 2. Thus, two continuous windings wound in the same direction around the magnetic circuits are obtained. Each coil has two accessible output leads 41.

To assemble the various parts comprising the afore-described magnetic head, use is made of an assembly unit 42 which has a substantially rectangular configuration and includes a longitudinal groove 44 and a plurality of spaced transverse grooves 46, the latter grooves serving to temporarily accommodate and position the bases 6 of the magnetic circuits in the desired spaced-apart relationship conforming to the desired vertically spaced alignment of the cores 2 and 4.

To assemble a magnetic head using the assembly 42, the bottom air gap wedge 34 and the two ceramic plates 30 and 32 are first placed in the longitudinal groove 44 of the unit 42. Then, the casing 17 is placed on the unit 42 followed by the common spacer 18. Each half-core is inserted into a spacer notch 26 and hence into a corresponding slot 36 in the plates 30 or 32; the spring 29 thereupon biasing the abutting relationship with the notch and the slot in which the half-core has been initially inserted. The assembly is then covered with blocking plate 20. The assembled magnetic head is then turned over and placed upon a flat supporting surface with the assembly unit 42 facing upward for removal. After removing the unit 42, it is then possible to pour a cementatious material, such as, a heating hardening thermosetting resin, into the head. After drying, the reading surface may be ground flush with the upper surface of the plate 20. If desired, a certain amount of the same cementatious material may also be poured into the air gaps between opposed pairs of half-cores to prevent the entry therein of foreign matter, such as metal particles which may be produced when, for instance, the reading surface is subjected to machining or grinding operations.

As will be apparent, this invention makes possible the manufacturing of all parts in advance of final assembly. Furthermore, it will be appreciated that the assembly of the instant magnetic head is extremely simple compared to conventional magnetic heads which require the partial assembly of one or more components of the head followed by machining operations prior to the final assembly thereof. Moreover, by using printed circuits it is possible to incorporate all the windings of a plurality of half-cores on a single plate. It will be further noted that the plates 30 and 32 also contribute to the longitudinal support and rigidity of the rear air gap wedge. In view of the above, it will be appreciated that the cost of a magnetic head constructed in accordance with this invention may and usually will be significantly lower than prior art magnet heads of similar type. For example, the common spacer may be machined rather than stamped to a particular configuration or contour, in which case, the shape of the notches 26 and the accommodated ends of each half-core could be modified as desired. Similarly, although the use of such magnetic heads finds particular application in reading or storing digital information, it might also be used to read or store analog information at medium frequencies.

While there has been described what is at present considered to be one embodiment of this invention, it will be obvious to those skilled in the art that various changes and modifications may be made in the instrument without departing from the invention, and it is, therefore, intended to cover all such changes and modifications as fall within the true spirit and scope of the invention.

What is claimed is:

1. A magnetic head including two substantially parallel rows of core-halves, each core-half having a magnetic pole at one end thereof, the head comprising, a spacer member mounted internally between the two rows of core-halves and including opposite edges having pairs of spaced-apart and transversely aligned recesses individually formed by two sidewalls and a contiguous end wall in the spacer member, each recess receiving and seating at least internal portions of a different one of the core halves proximate the pole end thereof, the transverse distances between the end walls of oppositely aligned recesses establishing the gap spacing between oppositely aligned core poles and the lateral spacing between adjacent side walls of the recesses establishing the lateral separation between adjacent core-halves.

2. The magnetic head as claimed in claim 1 which further comprises, means for biasing the opposed core poles into abutting relationship with the end walls forming the recesses.

3. The magnetic head as claimed in claim 1 wherein, the pole ends of each core-half project from one surface of said spacer member and additionally, wherein a second member having a row of spaced-apart apertures therein is mounted on said one surface of said spacer member with each aperture thereof aligned with a pair of transversely aligned recesses.

4. The magnetic head as claimed in claim 3 wherein, said spacer member and said second member have substantially rectangular cross-sections and wherein the portion of each core-half contiguous to a core end has a substantially right-angled portion abutting the end wall of a recess and a portion of said one surface of said spacer member, the outer right-angled portions of each core end projecting from said one surface and lying at least in close adjaceny to an internal wall formed by an aperture in said second member.

5. A magnetic head comprising a non-magnetic spacer plate mounted on said head and including two opposite edges formed with spaced-apart slots, each slot being formed in an edge of said spacer plate by two inwardly extending side walls and an inner end wall and being transversely aligned with a different one of the slots in an opposite spacer plate edge, a plurality of magnetic half-cores, each half-core including a core pole that projects above one surface of said spacer plate and inner and outer opposite edges, each slot receiving therein a portion of the inner edge of each half-core adjacent a core pole with the inner edge portion thereof in abutting relationship with a slot end wall whereby the transverse distance between oppositely aligned slot end walls determine the gap spacing between correspondingly opposed core poles and a second plate mounted on said one surface of said spacer plate and including a row of apertures, each aperture being formed internal of said second plate by respectively opposed pairs of side and contiguous end walls, the side walls of each aperture being transversely aligned with the side walls of pairs of oppositely aligned slots and the contiguous end walls being substantially aligned with the outer edges of opposed pairs of core poles so that with said second plate on said spacer plate, outward displacement of said core poles is prevented.

6. The magnetic head as claimed in claim 5 which additionally comprises, means mounted on said head for biasing opposed half-cores toward one another.

7. The magnetic head as claimed in claim 5 wherein, each half-core includes a base end and which additionally comprises, a third non-magnetic plate having a row of cavities formed therein mounted on said head adjacent the base ends of the half-cores and in substantial alignment with the apertures formed in said second plate, the base ends of at least certain of the half-cores being received by different ones of the cavities formed in said third plate.

8. The magnetic head as claimed in claim 7 which further comprises, at least one electrical winding mounted on said third plate in encircling relationship to each cavity and to the half-core base received by that cavity.

9. The magnetic head as claimed in claim 8 wherein, each electrical winding is printed on one surface of said third plate.

10. The magnetic head as claimed in claim 8 wherein, electrical windings are printed on opposite surfaces of said third plate in encircling relationship to each cavity.

11. The magnetic head as claimed in claim 5 wherein, each half-core includes an inwardly extending base end and which additionally comprises third and fourth non-magnetic plates mounted on said head in parallel, side-by-side relationship adjacent the base ends of the half-cores, said third and fourth plates having a row of substantially concentric cavities formed therein in substantial alignment with the apertures formed in said second plate, each cavity receiving a terminal portion of the base end of a different one of the half-cores, and an electrical winding encircling each cavity.

12. The magnetic head as claimed in claim 11 which additionally comprises, insulating means interposed between opposed terminal portions of the half-core base ends for providing magnetic isolation between opposed half-cores.

13. The magnetic head as claimed in claim 12 wherein, said insulating means comprises a wedge of insulating material.

14. A magnetic head comprising, a non-magnetic spacer plate mounted on the head and including two opposite edges formed with inwardly projecting spaced-apart slots, the slots in one edge of said spacer plate being in opposite transverse alignment with individual slots in an opposed edge, each slot being formed by a pair of side walls and a contigous end wall formed in the spacer plate, a plurality of magnetic half-cores, each half-core being received by a slot and including respective inner and outer peripherial edges and a pole end, means mounted on the head for inwardly biasing each half-core so that the inner peripherial edge thereof abuts the end wall of a slot, the distances between oppositely aligned end walls establishing the gap spacing between oppositely aligned pole ends, the pole ends of the half-cores projecting from one surface of said spacer plate, and a pole-end constraining plate mounted on the one surface of said spacer plate and including two rows of transversely spaced-apart abutments for individually engaging a portion of the outer peripheral edge of each core-half whereby outward displacement of the pole ends is prevented.

15. A magnetic head comprising two parallel rows of magnetic core-halves, each core-half including a magnetic pole and first and second contiguous sections of substantialy rectangular cross-section, the first section forming a half-core pole and having an interior surface which forms a substantial right angle with respect to a contiguous inner surface of said second cross-section, a spacer member having a substantially rectangular cross-section positioned between the rows of opposed core-halves with the longtiudinal axis thereof substantially parallel to the parallel rows of core-halves, the spacer member having one surface facing exteriorly of the rows of core-halves and opposite edges of said spacer plate having a plurality of spaced-apart slots therein, each slot being formed by two parallel side walls extending into the spacer plate substantially perpendicular to the longitudinal axis thereof and an end wall substantially parallel to said longitudinal axis, the lateral distance between the side walls of each slot being slightly greater than the width of a second cross-section of one of said core-halves which is received by a slot and thereby aligned by the side walls thereof, the substantially right-angled interior surfaces of each core-half bearing against at least a portion of the end wall of a receiving slot and adjacent portion of said one surface of said spacer plate, the transverse distances between the end walls of transversely opposed slots establishing the gap spacings between oppositely aligned core poles.

References Cited

UNITED STATES PATENTS

| | | | |
|---|---|---|---|
| 2,888,522 | 5/1959 | McCutchen, Jr. et al. | 179—100.2 |
| 2,991,511 | 7/1961 | Kornel | 29—603 |
| 3,064,333 | 11/1962 | Kristiensen et al. | 29—603 |
| 3,311,711 | 3/1967 | Maryatt et al. | 340—174.1 |
| 3,349,193 | 10/1967 | Vice | 179—100.2 |
| 3,417,465 | 12/1968 | Glass | 29—603 |

BERNARD KONICK, Primary Examiner

V. P. CANNEY, Assistant Examiner

U.S. Cl. X.R.

179—100.2; 346—74